(12) United States Patent
Stahl

(10) Patent No.: US 9,816,615 B2
(45) Date of Patent: *Nov. 14, 2017

(54) METHOD FOR THE PRODUCTION OF A SEALING RING

(75) Inventor: Hermann Stahl, Steinheim (DE)

(73) Assignee: CARL FREUDENBERG KG, Weinheim (DE)

(*) Notice: Subject to any disclaimer, the term of this patent is extended or adjusted under 35 U.S.C. 154(b) by 1145 days.

This patent is subject to a terminal disclaimer.

(21) Appl. No.: 12/670,968

(22) PCT Filed: Jul. 23, 2008

(86) PCT No.: PCT/EP2008/006042
§ 371 (c)(1),
(2), (4) Date: Jan. 27, 2010

(87) PCT Pub. No.: WO2009/015815
PCT Pub. Date: Feb. 5, 2009

(65) Prior Publication Data
US 2010/0187767 A1   Jul. 29, 2010

(30) Foreign Application Priority Data

Aug. 1, 2007 (EP) ..................................... 07015098

(51) Int. Cl.
 *B23K 26/00* (2014.01)
 *F16J 15/3252* (2016.01)
 (Continued)

(52) U.S. Cl.
CPC ......... *F16J 15/3252* (2013.01); *B23K 26/262* (2015.10); *B23K 26/38* (2013.01); *F16J 15/328* (2013.01)

(58) Field of Classification Search
CPC ............................. B23K 26/265; F16J 15/328
USPC ............. 219/121.64, 121.63, 59.1, 60.2, 61, 219/121.67, 121.7, 121.71, 121.85; 29/159 A, 475, 477, 480
See application file for complete search history.

(56) References Cited

U.S. PATENT DOCUMENTS 3,787,960 A   1/1974   Greenleaf
3,798,728 A   3/1974   Beisch
(Continued)

FOREIGN PATENT DOCUMENTS

CN   2630583 Y   8/2004
CN   1533860 A   10/2004
(Continued)

OTHER PUBLICATIONS

International Search Report dated Nov. 19, 2008 issued in connection with PCT/EP2008/006042.
(Continued)

*Primary Examiner* — Thien S Tran
(74) *Attorney, Agent, or Firm* — Leydig, Voit & Mayer, Ltd.

(57) ABSTRACT

A method for producing a sealing ring comprises cutting a sheet-metal strip to a length of a ring circumference using laser cutting; forming the sheet-metal strip into a ring shape having first and second mutually contacting edge surfaces; and joining the first and second mutually contacting edges using laser welding so as to form a substance-to-substance bond.

2 Claims, 5 Drawing Sheets

(51) Int. Cl.
  *B23K 26/38* (2014.01)
  *F16J 15/328* (2016.01)
  *B23K 26/262* (2014.01)

(56) References Cited

U.S. PATENT DOCUMENTS

| | | | |
|---|---|---|---|
| 4,178,148 A * | 12/1979 | Bunch | 425/393 |
| 4,353,236 A * | 10/1982 | Byrd | 72/193 |
| 4,616,540 A | 10/1986 | Morhard | |
| 4,827,099 A * | 5/1989 | Krebs et al. | 219/121.63 |
| 4,850,522 A | 7/1989 | Nichols | |
| 4,854,493 A | 8/1989 | Fujii et al. | |
| 4,905,885 A | 3/1990 | Hellman, Sr. | |
| 5,101,089 A * | 3/1992 | Bortolotto et al. | 219/121.63 |
| 5,147,999 A * | 9/1992 | Dekumbis et al. | 219/121.63 |
| 5,182,428 A | 1/1993 | Jack et al. | |
| 5,283,415 A | 2/1994 | Nishi et al. | |
| 5,407,494 A * | 4/1995 | Post | 148/521 |
| 5,502,292 A | 3/1996 | Pernicka et al. | |
| 5,510,597 A | 4/1996 | Kampmann et al. | |
| 5,595,670 A | 1/1997 | Mombo-Caristan | |
| 6,183,047 B1 * | 2/2001 | Kuhl | 301/95.106 |
| 6,188,037 B1 | 2/2001 | Hamada et al. | |
| 6,513,219 B1 * | 2/2003 | Lanzarini et al. | 29/417 |
| 6,764,079 B1 | 7/2004 | Hegemier et al. | |
| 7,495,193 B2 | 2/2009 | Myers et al. | |
| 2002/0008094 A1 | 1/2002 | Briand et al. | |
| 2003/0162641 A1 * | 8/2003 | Reynolds | 492/54 |
| 2007/0075499 A1 | 4/2007 | Uhrner et al. | |
| 2009/0212031 A1 | 8/2009 | Stahl et al. | |

FOREIGN PATENT DOCUMENTS

| | | | | |
|---|---|---|---|---|
| DE | 19755391 A1 * | 6/1999 | | F16J 15/32 |
| DE | 10 2006 046 414 A1 | 3/2007 | | |
| EP | 1818581 A | 8/2007 | | |
| EP | 1818581 A1 | 8/2007 | | |
| GB | 1369312 A | 10/1974 | | |
| GB | 2103521 A | 2/1983 | | |
| WO | 2006075209 A2 | 7/2006 | | |
| WO | WO 2006/075209 A | 7/2006 | | |

OTHER PUBLICATIONS

Excerpt from Wikipedia (E2).
Dubbel Taschenbuch Fuerden Maschinenbau 20.Auflage, pp. G3-G6 (E3).
Dubbel Taschenbuch Fuerden Maschinenbau 20.Auflage, pp. S85-S86 (E4).
Notice of Opposition filed on Oct. 6, 2010 for European Application No. 07015098.2.
European Patent Office, European Search Report in European Patent Application No. EP 06 00 27 13 (Jul. 11, 2006).
European Patent Office, European Search Report in European Patent Application No. EP 07 01 5098 (Dec. 7, 2007).
European Patent Office, International Search Report in International Patent Application No. PCT/EP2007/000863 (Aug. 16, 2007).
Möglichkeiten der Einbindung von e-Systemen in reale Umgebungen, ZI—Das Zukunftsmagazin, Mar. 2006, issue 01, pp. 1 and 3.
www.google.de, location on world-wide web of laserschneiden und laserschweiβen video.
Goetzewerke Friedrich Goetze, P.A. 415968, Wellendichtung, Burscheid, Jul. 24, 1957, pp. 1-6.
Zwei Arbeitsgänge unter einem Hut, INDUSTRIE anzeiger, Fachartikel, Nov. 28, 2005, p. 1.
Akl'06-Vorführungen, Fraunhofer Institut Lasertechnik, May 5, 2006, pp. 13-16.
Spin-Off: Laserfact GmbH, Fraunhofer ILT: Laserfact GmbH, Feb. 2006, p. 6.
Laser—Laborgerät oder Werkzeug?, Der Wirtschaftsverlag, Feb. 16, 2006, pp. 1-3.
Flexibilität beginnt im Kopf—Laserschweißen und—schneiden mit dem Kombikopf, Fraunhofer Institut Lasertechnik, Sep. 2006, pp. 1-2.
Nebenzeiten senken und Flexibilität steigern, Im Fokus: Blechverarbeitung, technica Jun. 6-7, 2007, pp. 18-20.
Dirk Petring et al., Lasertechnik Multifunktionaler Laserbearbeitungskopf, MM Das Industrie Portal, May 23, 2007, pp. 1-3.

* cited by examiner

METHOD FOR THE PRODUCTION OF A SEALING RING

This application is a U.S. National Phase Application under 35 U.S.C. §371 of International Application No. PCT/EP2008/006042, filed on Jul. 23, 2008 and claims benefit to European Patent Application No. EP 07015098.2, filed on Aug. 1, 2007. The International Application was published on Feb. 5, 2009 as WO 2009/015815 under PCT Article 21 (2).

FIELD OF THE INVENTION

The present invention relates to a method for producing a sealing ring, in the case of which a ring is initially formed from an endless sheet-metal strip whose mutually contacting edges are joined together in a substance-to-substance bond.

BACKGROUND OF THE INVENTION

A method of this kind is known from the German Patent Application DE 197 55 391 A1. It discusses first fabricating a ring from a sheet-metal strip and then of reshaping it into a supporting ring in a post-deformation process. The mutually contacting edges are joined together in a substance-to-substance bond by welding or soldering. The post-deformation can be accomplished by roll-forming or deep-drawing, it being possible for the supporting ring to be provided with different contours. Supporting rings must generally exhibit a superior surface quality, at least on the outer periphery thereof, since this surface forms a static sealing surface for sealing the sealing ring against a housing. This requires a good roundness profile and minimal roughness. When soldering is used for the joining process, it is disadvantageous that a good capillary effect is only attainable when the distance between the mutually contacting edges is small. It is also disadvantageous that the surfaces must be wettable. In the case of a substance-to-substance bond produced by welding, concave depressions frequently form at the join due to material creep. These concave depressions can result in leakiness of the sealing ring. Moreover, the edges of the sheet-metal strip must have a substantially uniform form.

SUMMARY OF THE INVENTION

An aspect of the present invention is to further refine the previously known method in a way that will make it possible to create a high-quality and uniform weld seam.

In the case of the method according to the present invention for producing a sealing ring, a ring is formed from an endless sheet-metal strip, the sheet-metal strip being cut to the length of the ring circumference by laser cutting, and the mutually contacting edges of the sheet-metal strip being joined together by laser welding in a substance-to-substance bond. During the laser welding process, a high level of energy is input over a small cross section, thereby yielding only a small zone of molten material. The result is only a slight microstructural change. Moreover, the welding tool is nonwearing. During the laser cutting process, a high level of energy is likewise input over a small cross section. In this case, though, the level of energy input is so high that the sheet-metal strip is cut. However, since the affected zone is nevertheless small and is approximately as large as the plane of separation, two edges are formed having a precise cutting pattern, and the plane of separation is produced in a burr-free process. A further advantage is that the edge does not exhibit a fracture surface, as typically arises during blanking. Such fracture surfaces typically extend obliquely, thereby requiring a flux during the subsequent welding. Since the edges cut by laser cutting do not have any obliquely or irregularly extending fracture surfaces, the mutually contacting edges may be joined together in this case by welding without the use of any flux. It is also possible to employ laser cutting to remove any fragments on one or every edge. A precisely developed length, which is not influenced by any forming process, is also thereby achieved in the context of negligible roundness deviations. In the case of the method according to the present invention, pretreated, for example, phosphatized sheet metals may be advantageously used. The method according to the present invention, in particular, the laser cutting and the laser welding as well, only have an insignificant effect on this pretreatment. The heat-affected zone in the laser cutting and the laser welding process is small, so that the pretreatment is only negligibly affected. This is especially beneficial because it is more cost-effective to pretreat the sheet-metal sections than it is to pretreat the finished supporting rings.

One single laser device may be used to perform the laser cutting and the laser welding. The costs for the device for producing the sealing rings may be thereby reduced since, in this case, only one laser source is still needed, the laser light being deflected via an optical system for laser cutting and laser welding. In this context, the laser beam is adapted in each case for cutting or welding by changing the focal distance, for example, through the use of a movable optical system.

In a subsequent operation, the weld seam may be flattened, at least on the outer periphery. The process control is preferably carried out, particularly in the context of flux-assisted welding, in such a way that a raised portion is produced along the weld seam, at least on the outer periphery. This raised portion is flattened in a subsequent operation. The flattening process is preferably carried out in two steps by machine-cutting removal, for example, by planing, broaching or grinding and subsequent smooth-rolling. The stresses produced in the structure by the forming thereof are reduced by plastic deformation in the roll-forming process.

The ring may be shaped by roll-forming. Using one tool, it is possible to obtain a great variety of forms in a roll-forming process. For example, the known cup-shaped supporting rings may be fabricated, for example. However, different surface profiles, undercuts and recesses may be introduced into these supporting rings.

The circumferential edges of the ring may be shaped in a noncutting process. The circumferential edges of rings, which are to be processed into sealing rings, preferably feature a chamfer that simplifies the manufacturing and also the installation of the sealing ring. Chamfers of this kind are often manufactured in a machine-cutting process, for example, by turning. However, a noncutting process is able to be better integrated into the manufacturing process. In this context, the profiling of the edge is preferably accomplished by roll-forming.

The ring may be calibrated in an integrated process step. The calibration improves the dimensional accuracy of the rings. Since the outside diameter of a supporting ring is often also a sealing surface, the dimensional accuracy is particularly important since it influences the seating of the sealing ring in the bore to be sealed. Welding processes and other subsequent machining steps may cause dimensional variations that are compensated by the subsequent calibration.

In a method according to the present invention, the calibration process entails cutting the sheet-metal strip to length in such a way that a ring having undersized dimensions is initially produced. This undersized ring is subsequently resized to the nominal dimensions by widening of the same in a device. In this manner, rejected material is avoided since considerable difficulty is entailed in resizing oversized rings to the nominal dimensions. On the other hand, undersized rings may be resized to nominal dimensions by widening of the same.

Thus, the method according to the present invention makes it possible for supporting rings to be manufactured in a great variety of forms for sealing rings.

BRIEF DESCRIPTION OF THE DRAWING

The method according to the present invention is clarified in greater detail in the following with reference to the figures.

DETAILED DESCRIPTION

Figure 1:
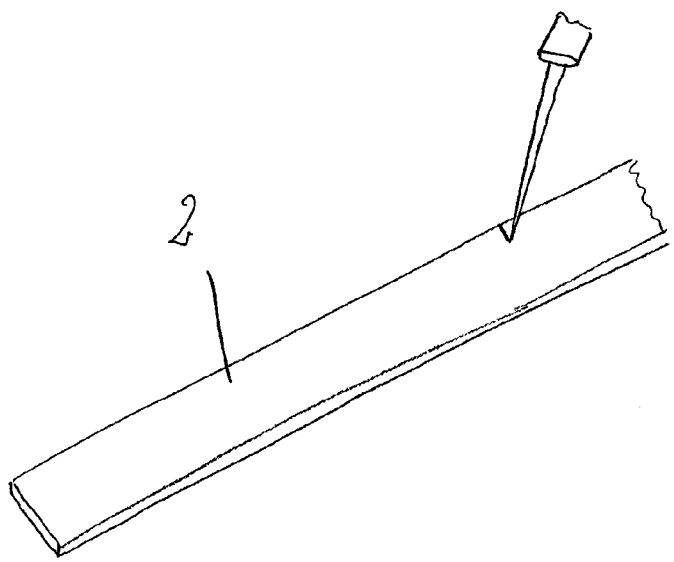
FIGS. 1 through 4 illustrate the process for producing a supporting ring of a seal according to the present invention.
Figure 2:
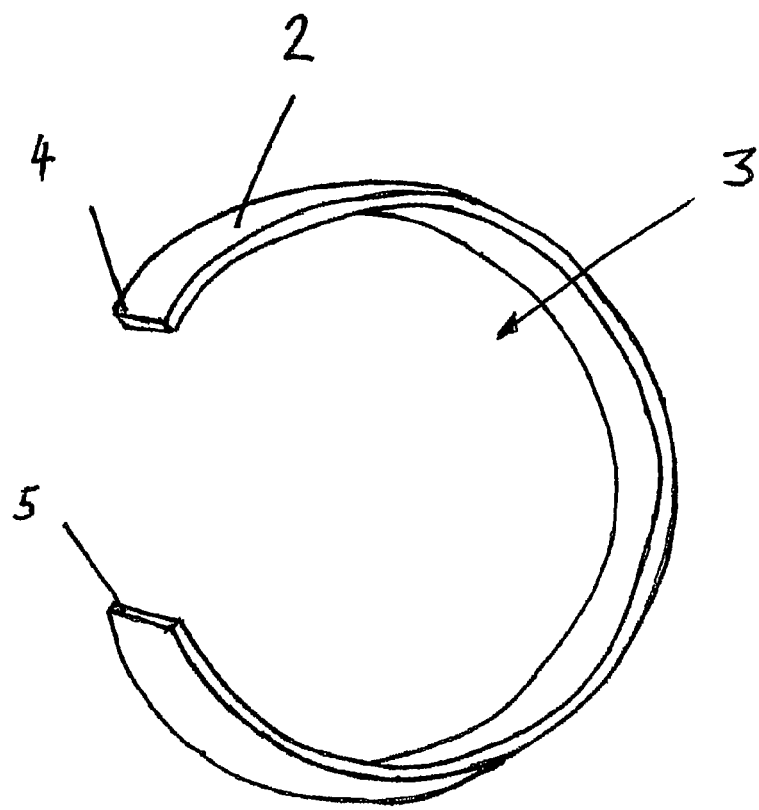
Figure 3:
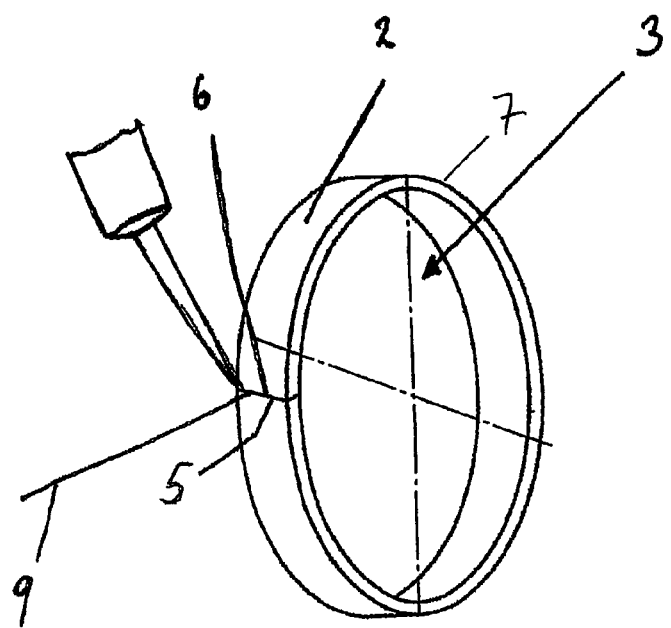
Figure 4:
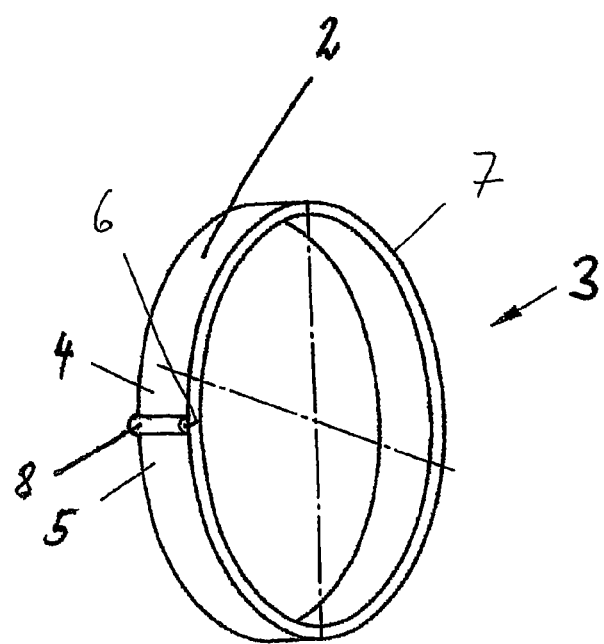

FIGS. 1 through 4 illustrate the method according to the present invention for producing a sealing ring 1. In this context, an endless sheet-metal strip 2 is first cut to length from a roll by laser cutting (FIG. 1). In the process, the length of sheet-metal strip 2 is selected in such a way that a ring 3 having undersized dimensions is later formed. A ring 3 (FIG. 1) is subsequently produced from sheet-metal strip 2 by roll-forming. In a next step, mutually contacting edges 4, 5 of sheet metal 2 that is formed into a ring 3, are joined together in a substance-to-substance bond. For that purpose, edges 4, 5 are mutually butted and are welded together in a substance-to-substance bond by laser-beam welding assisted by the feeding of a flux 9 (FIG. 3). The bond is produced in such a way that a bead 8 is thereby formed along weld seam 6, at least on the outer periphery (FIG. 4). This bead 8 is flattened in a subsequent machining process, which, in this case, is carried out as cutting and subsequent roll-forming. Other embodiments provide for the subsequent machining to be carried out as a deep-drawing or a machine-cutting process, such as by turning on a lathe, milling or grinding, for example. One single laser beam source is used for the laser welding and the laser cutting. In the next step, ring 3 is shaped and profiled by roll-forming, and circumferential edges 7 are likewise subsequently profiled in a noncutting process by roll-forming, so that a chamfer is produced. In a last calibration step, ring 3, which has undersized dimensions, is widened by a device and thereby resized to the nominal dimensions.

Figure 5:
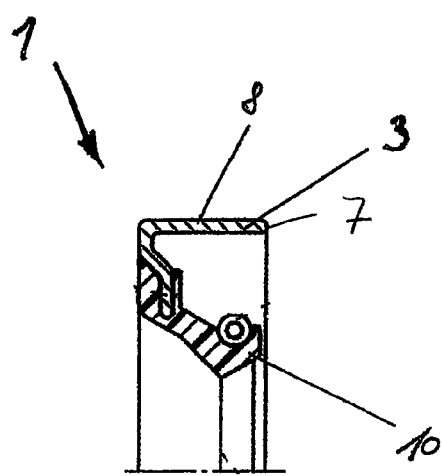
FIG. 5 shows a seal according to the present invention.

FIG. 5 shows a sealing ring 1 having a supporting ring 8. Supporting ring 8 is formed by a ring 3 that had been produced using the previously described method. A sealing lip 10 that provides dynamic sealing action is vulcanized onto supporting ring 8. A sheet metal 2, which had undergone a phosphatizing pretreatment to enhance the adhesive strength of the elastomer material, was used for supporting ring 8.

The invention claimed is:

1. A method for producing a sealing ring having an outside circumference forming a sealing surface, the method comprising:
    cutting a sheet-metal strip to a length of a ring circumference using laser cutting;
    forming the sheet-metal strip into a ring shape having first and second mutually contacting edge surfaces;
    joining the first and second mutually contacting edge surfaces using laser welding assisted by a feeding of a flux so as to form a substance-to-substance bond;
    and calibrating the ring,
    wherein the cutting includes first producing the ring with undersized dimensions and the calibrating includes widening the ring to nominal dimensions so as to form the sealing surface at the outside circumference;
    further comprising profiling a first and a second circumferential edge of the ring shape using a non cutting process.

2. The method as recited in claim 1, wherein the profiling includes roll-forming.

\* \* \* \* \*